US009983297B2

(12) United States Patent
Hall et al.

(10) Patent No.: US 9,983,297 B2
(45) Date of Patent: May 29, 2018

(54) LIDAR BASED 3-D IMAGING WITH VARYING ILLUMINATION FIELD DENSITY

(71) Applicant: Velodyne Lidar, Inc., Morgan Hill, CA (US)

(72) Inventors: David S. Hall, Los Altos Hills, CA (US); Pieter J. Kerstens, Gilroy, CA (US); Mathew Noel Rekow, Santa Cruz, CA (US); Stephen S. Nestinger, Santa Clara, CA (US)

(73) Assignee: Veloyne Lidar, Inc., Morgan Hill, CA (US)

( * ) Notice: Subject to any disclaimer, the term of this patent is extended or adjusted under 35 U.S.C. 154(b) by 0 days. days.

(21) Appl. No.: 15/464,227

(22) Filed: Mar. 20, 2017

(65) Prior Publication Data

US 2017/0269198 A1    Sep. 21, 2017

Related U.S. Application Data

(60) Provisional application No. 62/311,290, filed on Mar. 21, 2016.

(51) Int. Cl.
*G01S 17/00* (2006.01)
*G01S 7/481* (2006.01)
*G01S 17/10* (2006.01)
*G01S 17/02* (2006.01)

(52) U.S. Cl.
CPC .......... *G01S 7/4815* (2013.01); *G01S 7/4816* (2013.01); *G01S 17/023* (2013.01); *G01S 17/10* (2013.01)

(58) Field of Classification Search
CPC ...... G01S 7/4815; G01S 17/023; G01S 17/10; G01S 7/4816
See application file for complete search history.

(56) References Cited

U.S. PATENT DOCUMENTS

| 7,969,558 | B2 | 6/2011 | Hall | |
|---|---|---|---|---|
| 8,675,181 | B2 | 3/2014 | Hall | |
| 8,767,190 | B2 | 7/2014 | Hall | |
| 2012/0038903 | A1* | 2/2012 | Weimer | ................... G01C 3/08 356/4.07 |
| 2013/0314711 | A1* | 11/2013 | Cantin | .................... G01S 17/10 356/445 |
| 2015/0035437 | A1* | 2/2015 | Panopoulos | ............ F21V 14/02 315/112 |
| 2016/0014309 | A1* | 1/2016 | Ellison | ................. G02B 27/644 248/550 |

* cited by examiner

*Primary Examiner* — Hovhannes Baghdasaryan
(74) *Attorney, Agent, or Firm* — Spano Law Group; Joseph S. Spano

(57) ABSTRACT

Methods and systems for performing three dimensional LIDAR measurements with varying illumination field density are described herein. A LIDAR device includes a plurality of pulse illumination sources and corresponding detectors. The current pulses supplied to the pulse illumination sources are varied to reduce total energy consumption and heat generated by the LIDAR system. In some embodiments, the number of active pulse illumination sources is varied based on the orientation of the LIDAR device, the distance between the LIDAR device and an object detected by the LIDAR device, an indication of an operating temperature of the LIDAR device, or a combination thereof. In some embodiments, the number of active pulse illumination sources is varied based on the presence of an object detected by the LIDAR device or another imaging system.

17 Claims, 10 Drawing Sheets

LIDAR BASED 3-D IMAGING WITH VARYING ILLUMINATION FIELD DENSITY

CROSS REFERENCE TO RELATED APPLICATION

The present application for patent claims priority under 35 U.S.C. § 119 from U.S. provisional patent application Ser. No. 62/311,290, entitled "LIDAR Based 3-D Imaging With Varying Illumination Field Density," filed Mar. 21, 2016, the subject matter of which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Existing LIDAR systems employ a beam of light to interrogate a particular volume of the surrounding environment at any given time. The detection of return signals includes significant sources of measurement noise that are exacerbated as measurement ranges are extended. In many applications, the signal to noise ratio of measured signals is improved by increasing laser pulse intensity.

In addition, imaging resolution depends on the density of the 3-D "point cloud" generated by the LIDAR system. Oftentimes, to improve imaging resolution, the density of the 3-D "point cloud" is increased by increasing the rate of pulse emission and capture of corresponding return signals.

Increases in pulse rate, pulse intensity, or both, require increases in light emission, and consequent increases in energy consumption and heat generation due to energy losses associated with the light source and power electronics. In particular, the additional heat generation is undesirable, particularly as the size of 3-D LIDAR systems continue to shrink.

Improvements in power management of LIDAR systems are desired, while maintaining sufficiently high levels of imaging resolution and range.

SUMMARY

Methods and systems for performing three dimensional LIDAR measurements with varying illumination field density are described herein. A LIDAR device includes a plurality of pulse illumination sources and corresponding detectors. The current pulses supplied to the pulse illumination sources are varied to reduce total energy consumption and heat generated by the LIDAR system.

In some embodiments, a pulsed illumination source and photosensitive detector are mounted to a rotating frame of the LIDAR device. This rotating frame rotates with respect to a base frame of the LIDAR device. In a further aspect, the LIDAR device includes an orientation sensor that measures the orientation of the rotating frame with respect to the base frame. In these embodiments, a computing system of the LIDAR system periodically receives an indication of the orientation of the rotating frame with respect to the base frame and varies the number of active pulse illumination sources based on the orientation.

In some embodiments, the LIDAR system is mounted to a vehicle operating on a roadway. The LIDAR system provides "point cloud" data to an image processing system that generates images of the environment surrounding the vehicle while it is operating on the roadway based on the "point cloud" data. In some operational scenarios, it may be desirable to obtain high resolution images of objects located in front of the vehicle and one or both sides of the vehicle. However, it may not be necessary to obtain high resolution images of objects behind the vehicle. In these examples, the LIDAR system is configured to utilize a maximum illumination field density when the illumination beam is directed toward the front and one or both sides of the vehicle. However, when the illumination beam is directed toward the rear of the vehicle, the number of active pulse illumination sources is reduced to reduce the resolution of collected data.

In some embodiments, the current pulses supplied to the pulse illumination sources are varied based on the distance between the LIDAR device and an object detected in the three dimensional environment. In one example, the current pulses supplied to the pulse illumination sources are adjusted to reduce the number of pulses for a period of time when the distance between the LIDAR device and an object detected in the three dimensional environment is less than a predetermined threshold value. In this manner, objects that are relatively close to the LIDAR device (e.g., 25 meters or less, 10 meters or less, etc.) are sampled by the LIDAR system with lower frequency. Since, the field of view of a rotational scanning LIDAR device extends radially, objects that are relatively close to a LIDAR device are sampled at higher resolution than objects that are relatively far from the LIDAR device, for a given illumination field density. However, for objects that are relatively close to the LIDAR device, this high sampling resolution may not be necessary to render sufficiently accurate images of close objects. In these examples, the the current pulses supplied to the pulse illumination sources are adjusted to reduce the sampling resolution for relatively close objects.

In some embodiments, the current pulses supplied to the pulse illumination sources are varied based on the presence of a detected object in the three dimensional environment. In one example, the current pulses supplied to the pulse illumination sources are adjusted to reduce the number of pulses for a period of time when an object is not detected within the field of view of the pulsed illumination beam for more than a predetermined period of time. For example, when the signals detected by the detector associated with the pulsed illumination beam are negligible in value (e.g., below a threshold value) for a predetermined period of time, a controller reduces the the current pulses supplied to the pulse illumination sources. In this manner, when an illumination beam is directed toward a volume of space that is devoid of objects (e.g., toward the horizon, toward the sky, etc.), energy consumption and heat generation is reduced. However, subsequently, when the signals detected by the detector associated with the pulsed illumination beam rise above the threshold value, a controller increases the current pulses supplied to the pulse illumination sources. In some examples, an object must be detected for a second, predetermined period of time after the first, predetermined period of time before controller 140 increases the current pulses supplied to the pulse illumination sources. These thresholds prevent spurious signals from causing rapid fluctuations in supplied currents.

In some embodiments, the LIDAR system includes, or is communicatively linked to an imaging device configured to generate an image of at least a portion of a field of view of the pulsed illumination source. In some embodiments, the imaging device is a computing system configured to generate an image from a number of points of the "point cloud" generated by the LIDAR device. In some of these embodiments, the computing system is separate from the LIDAR device and is communicately linked to the LIDAR device. In other embodiments, a computing system of the LIDAR system is configured to generate the image from the "point cloud" data. In some other embodiments, the imaging device includes a separate imaging sensor (e.g., camera) that captures an image of at least a portion of the field of view of the pulsed illumination source. In some of these embodiments, the imaging sensor is integrated into the LIDAR device. In some other embodiments, the imaging sensor is separate from, and communicatively linked to the LIDAR device.

In these embodiments, the current pulses supplied to the pulse illumination sources are varied based on whether an object is detected in an image of at least a portion of the field of view of the pulsed illumination source. In some examples, the current pulses supplied to the pulse illumination sources are decreased (i.e., the number of pulses for the given period of time is decreased) when there is no object detected in an image of the field of view of the pulsed illumination source. In some other examples, the current pulses supplied to the pulse illumination sources are increased when an object is detected in the image of the field of view of the pulsed illumination source.

In some embodiments, the current pulses supplied to the pulse illumination sources are varied based on an indication of operating temperature of the 3-D LIDAR device.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
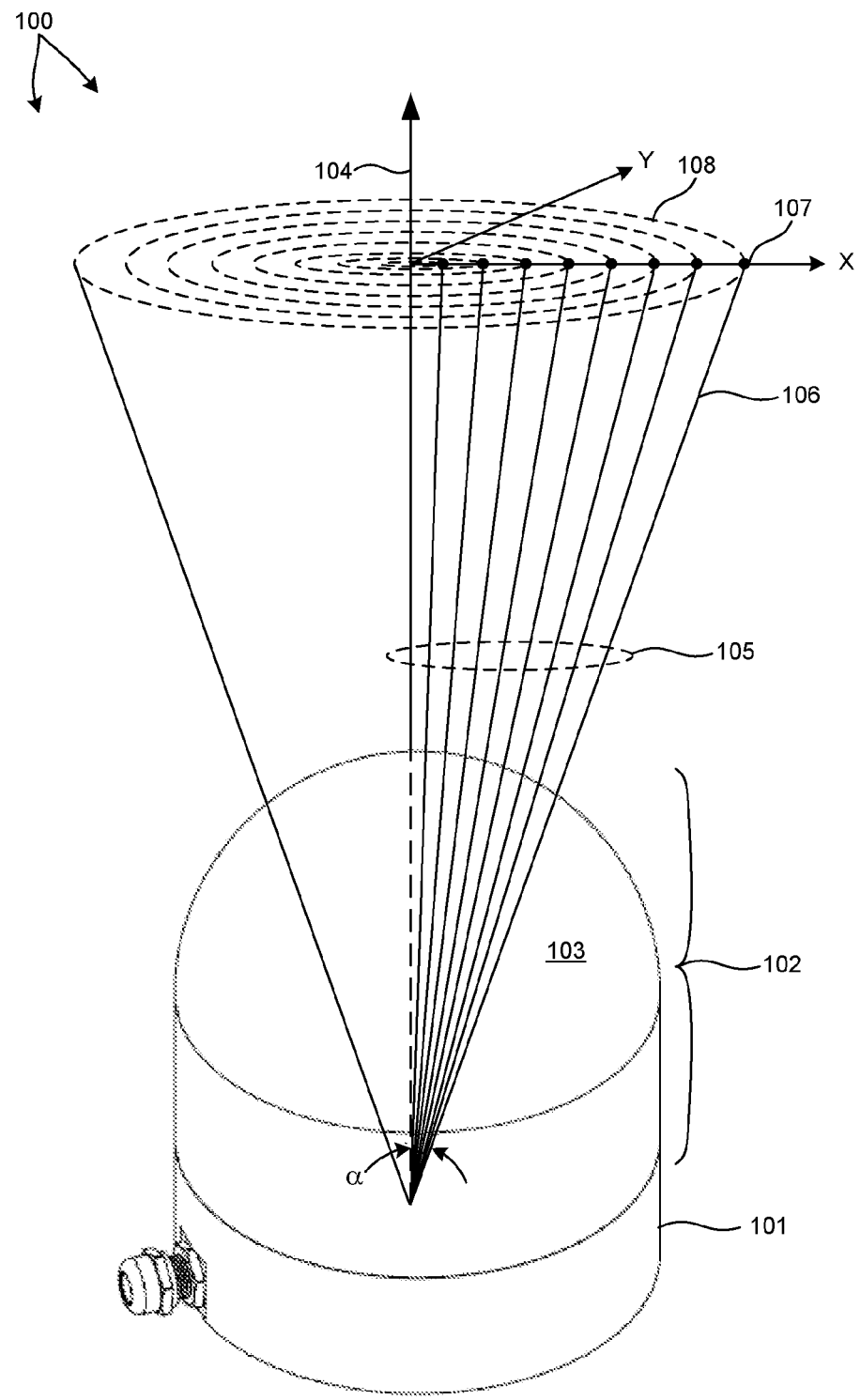
FIG. 1 is a simplified diagram illustrative of one embodiment of a 3-D LIDAR system 100 in at least one novel aspect.

FIG. 1 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelengths centered at 905 nanometers.

As depicted in FIG. 1, a plurality of beams of light 105 are emitted from 3-D LIDAR system 100 through domed shell element 103 over an angular range, a, measured from a central axis 104. In the embodiment depicted in FIG. 1, each beam of light is projected onto a plane defined by the x and y axes at a plurality of different locations spaced apart from one another. For example, beam 106 is projected onto the xy plane at location 107.

In the embodiment depicted in FIG. 1, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, beam 106 projected onto the xy plane traces out a circular trajectory 108 centered about central axis 104.

Figure 2:
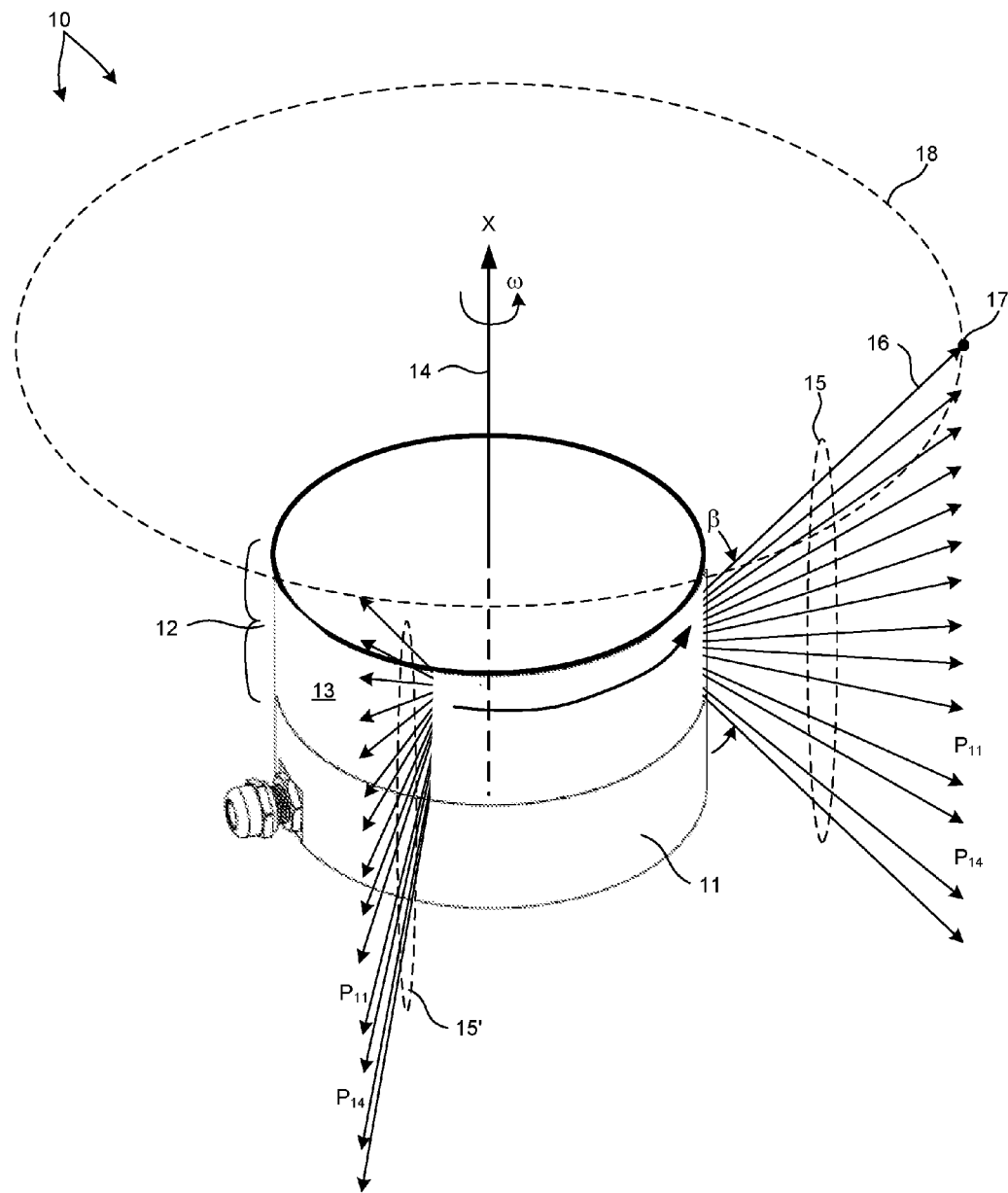
FIG. 2 is a simplified diagram illustrative of another embodiment of a 3-D LIDAR system 10 in at least one novel aspect.

FIG. 2 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 2, a plurality of beams of light 15 are emitted from 3-D LIDAR system 10 through cylindrical shell element 13 over an angular range, β. In the embodiment depicted in FIG. 2, the chief ray of each beam of light is illustrated. Each beam of light is projected outward into the surrounding environment in a plurality of different directions. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 2, 3-D LIDAR system 10 is configured to scan each of the plurality of beams of light 15 about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

Figure 3:
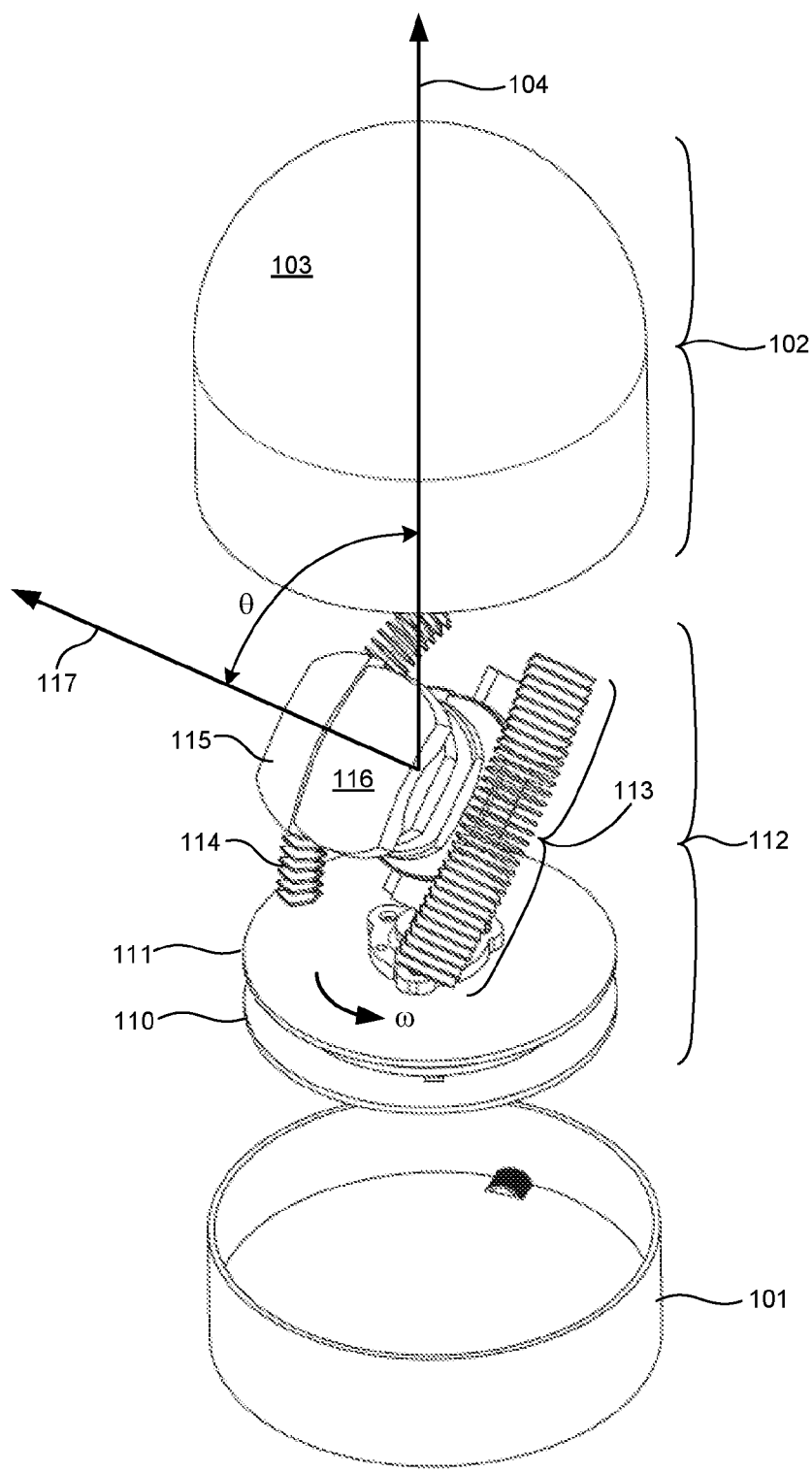
FIG. 3 depicts an exploded view of 3-D LIDAR system 100 in one exemplary embodiment.

FIG. 3 depicts an exploded view of 3-D LIDAR system 100 in one exemplary embodiment. 3-D LIDAR system 100 further includes a light emission/collection engine 112 that rotates about central axis 104. In at least one novel aspect, a central optical axis 117 of light emission/collection engine 112 is tilted at an angle, θ, with respect to central axis 104. As depicted in FIG. 3, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer, capacitive, or optical elements, resulting in a contactless transmission of these signals. Light emission/collection engine 112 is fixedly positioned with respect to the rotating electronics board 111, and thus rotates about central axis 104 at the predetermined angular velocity, w.

As depicted in FIG. 3, light emission/collection engine 112 includes an array of light emitting elements 114 and an array of light detecting elements 113. Light emitted from each of the light emitting elements 114 is directed toward a mirror (not shown). Light reflected from the mirror passes through a series of illumination optics 115 that collimate the emitted light into an array of beams of light 105 that are emitted from 3-D LIDAR system 100 as depicted in FIG. 1. In general, any number of light emitting elements can be arranged to simultaneously emit any number of light beams from 3-D LIDAR system 100. Light reflected from objects in the environment is collected by collection optics 116. Collected light passes through collection optics 116 where it is focused onto each detecting element of the array of detecting elements 113. After passing through collection optics 116, the collected light is reflected from a mirror (not shown) onto each detector element.

Figure 4:
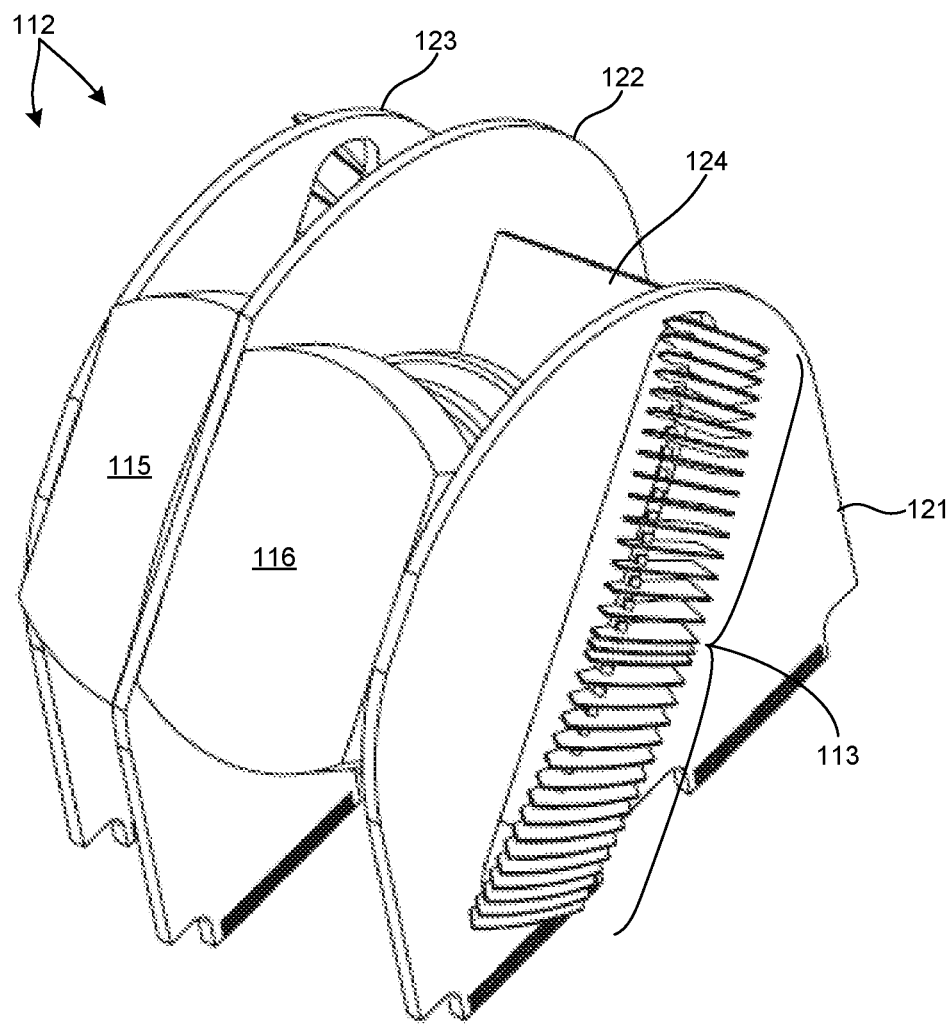
FIG. 4 depicts a view of light emission/collection engine 112 of 3-D LIDAR system 100.

FIG. 4 depicts another view of light emission/collection engine 112. In some embodiments, light emission/collection engine 112 includes intermediate electronics boards 121, 122, and 123 which provide mechanical support and electrical connectivity between rotating electronics board 111 and various elements of light emission/collection engine 112. For example, each of the array of light detecting elements 113 is mounted to intermediate electronics board 121. Intermediate electronics board 121, in turn, is mechanically and electrically coupled to rotating electronics board 111. Similarly, each of the array of light emitting elements 114 is mounted to intermediate electronics board 123. Intermediate electronics board 123, in turn, is mechanically and electrically coupled to rotating electronics board 111. In another example, illumination optics 115 and collection optics 116 are mechanically mounted to intermediate electronics board 122. In this example, intermediate electronics board 122 spatially and optically separates the illumination optics 115 and the collection optics 116 to avoid contamination of the collected light with illumination light. Intermediate electronics board 122, in turn, is mechanically and electrically coupled to rotating electronics board 111. In this manner, the intermediate electronics boards provide mechanical and electrical connectivity and additional board area for mounting electrical components required for the operation of 3-D LIDAR system 100.

Figure 5:
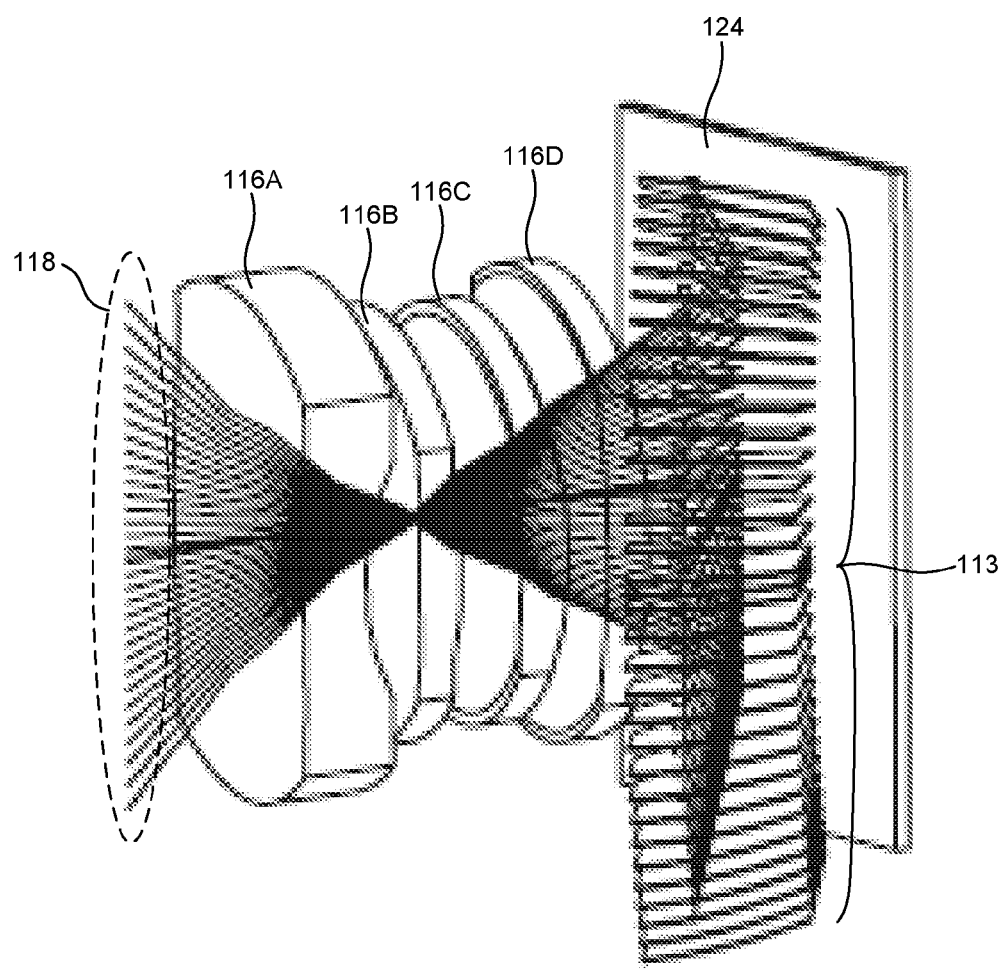
FIG. 5 depicts a view of collection optics 116 of 3-D LIDAR system 100 in greater detail.

FIG. 5 depicts a view of collection optics 116 in greater detail. As depicted in FIG. 5, collection optics 116 include four lens elements 116A-D arranged to focus collected light 118 onto each of the array of detecting elements 113. Light passing through collection optics 116 is reflected from mirror 124 and is directed onto each of the array of detecting elements 113. In some embodiments, one or more of the optical elements of collection optics 116 is constructed from one or more materials that absorb light outside of a predetermined wavelength range that includes the wavelengths of light emitted by each of the array of light emitting elements 114. In one example, one or more of the lens elements are constructed from a plastic material that includes a colorant additive to absorb light having wavelengths less than infrared light generated by each of the array of light emitting elements 114. In one example, the colorant is Epolight 7276A available from Aako BV (The Netherlands). In general, any number of different colorants can be added to any of the plastic lens elements of collection optics 116 to filter out undesired spectra.

Figure 6:
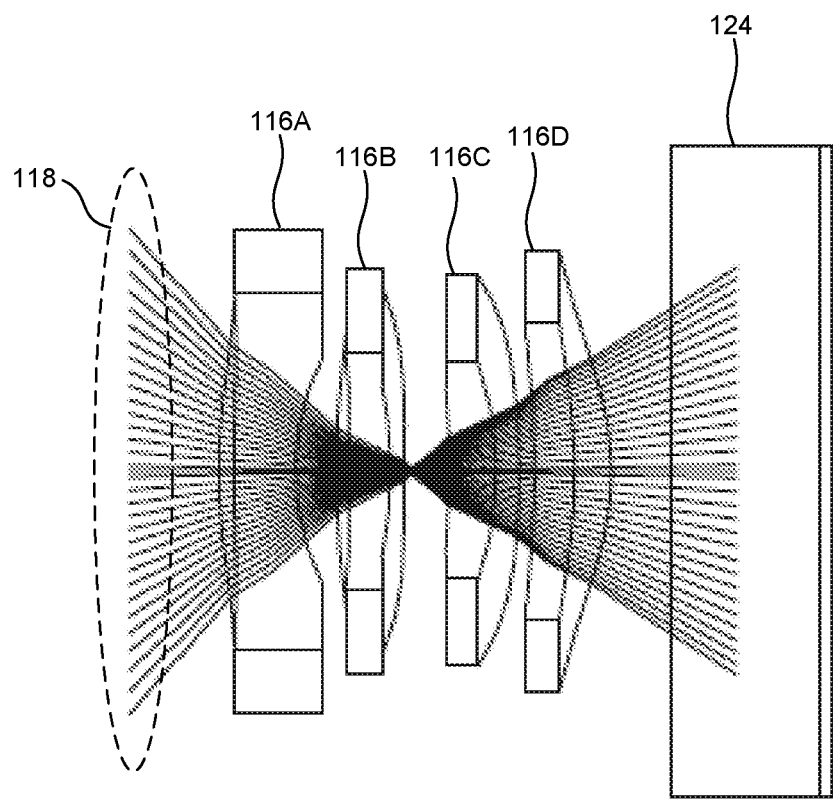
FIG. 6 depicts a cutaway view of collection optics 116 of 3-D LIDAR system 100 that illustrates the shaping of each beam of collected light 118.

FIG. 6 depicts a cutaway view of collection optics 116 to illustrate the shaping of each beam of collected light 118.

As described hereinbefore, one or more of the optical elements of collection optics 116 is constructed from one or more materials that absorb light outside of a predetermined wavelength range that includes the wavelengths of light emitted by each of the array of light emitting elements 114. However, in general, one or more of the optical elements of illumination optics 115 may also be constructed from one or more materials that absorb light outside of a predetermined wavelength range that includes the wavelengths of light emitted by each of the array of light emitting elements 114.

A LIDAR system, such as 3-D LIDAR system 10 depicted in FIG. 2, and system 100, depicted in FIG. 1, includes a plurality of pulsed illumination sources each emitting a pulsed beam of illumination light from the LIDAR device into the surrounding environment. In some embodiments, the pulsed illumination sources are laser based. In some embodiments, the pulsed illumination sources are based on one or more light emitting diodes. In general, any suitable pulsed illumination source may be contemplated.

In one aspect, the density of the illumination field illuminated by the plurality of pulsed illumination sources is varied to reduce total energy consumption and heat generated by the LIDAR system.

Figure 7:
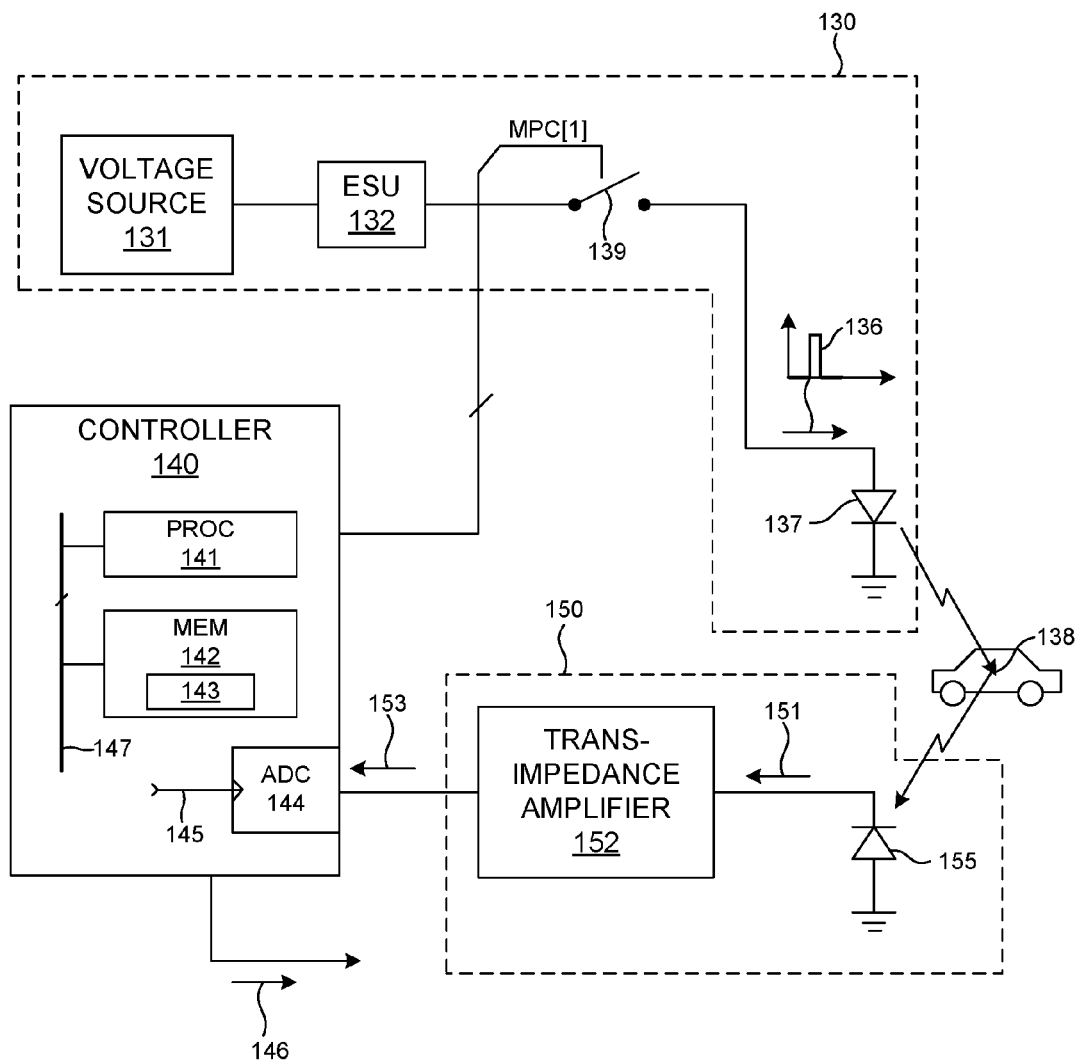
FIG. 7 depicts elements of a 3-D LIDAR system including a pulsed illumination system 130, a light detection system 150, and controller 140.

FIG. 7 depicts elements of a LIDAR system including a pulsed illumination system 130, a light detection system 150, and controller 140. Together pulsed illumination system 130 and light detection system 150 comprise a LIDAR measurement channel under the control of controller 140.

Pulsed illumination system 130 includes a pulsed light emitting device 137. Pulsed light emitting device 137 generates pulsed light emission in response to a pulsed electrical current signal 136 provided to the pulsed light emitting device. The light generated by pulsed light emitting device 137 is focused and projected onto a particular location 138 in the surrounding environment by one or more optical elements of the LIDAR system. In one example, light emitted by pulsed light emitting device 137 is focused and projected onto a particular location by illumination optics 115 that collimate the emitted light into a pulsed beam of light 16 emitted from 3-D LIDAR system 10 as depicted in FIG. 2.

Pulsed illumination system 130 includes an electrical energy storage element 132 selectively coupled to the pulsed light emitting device 137. In some examples, the energy storage element is a capacitor. A voltage source 131 is electrically coupled to the energy storage element. Voltage source 131 provides electrical energy to the electrical energy storage element 132. The electrical energy storage element 132 is selectively coupled to the pulsed light emitting device 137 by a switching element (e.g., switching element 139). The switching element 139 is configured to toggle between two states depending on the state of a control signal (e.g., digital control signal, MPC). In a first state, the switching element 139 is substantially non-conductive. In this state, energy storage element 139 is effectively disconnected from the pulsed light emitting device 137. In this state, electrical energy flows from the voltage source 131 to energy storage element 132 to effectively charge the electrical storage element. In a second state, the switching element is substantially conductive. In this state, energy storage element 132 is electrically coupled to the pulsed light emitting device 137. In this state, electrical energy flows from the energy storage element to the pulsed light emitting device 137.

As depicted in FIG. 7, electrical storage element 132 is selectively coupled to pulsed light emitting device 137. In this manner, the timing and shape of electrical current signal 136 provided to the pulsed light emitting device 137 is effectively controlled by control signal, MPC, generated by controller 140. Thus, the timing of pulses of light emitted from the LIDAR device are controlled by controller 140.

In general, a pulsed illumination system 130 may include any number of electrical energy storage elements selectively coupled in parallel with a pulsed light emitting device. Furthermore, one or more of the electrical energy storage elements may have an energy storage capacity that differs from one or more of the other electrical energy storage elements. In this manner, the amplitude and timing of the current signal 136 provided to the pulsed light emitting device 137 is controlled by control signal, MPC. In these embodiments, the amplitude and timing of the current signal 136 is achieved by controlling the timing and the number of energy storage elements coupled to the pulsed light emitting device 137. In some embodiments, multiple pulses are emitted for each LIDAR measurement by sequentially coupling multiple energy storage elements to pulsed light emitting device 137. In some other embodiments, the amplitude of the current signal 136 is controlled by selecting a number of energy storage elements that are simultaneously coupled to the pulsed light emitting device 137.

In general, each pulse commanded by controller 140 (e.g., via command signals, MPC) can vary in magnitude and duration. In some examples, one pulse of a sequence of measurement pulses has a larger amplitude than other pulses.

In a further embodiment, a LIDAR system, such as LIDAR system 10 depicted in FIG. 2, includes a number of LIDAR measurement channels, each including a pulsed illumination system (e.g., pulsed illumination system 130) operating in coordination with a common controller (e.g., controller 140).

Figure 9A:
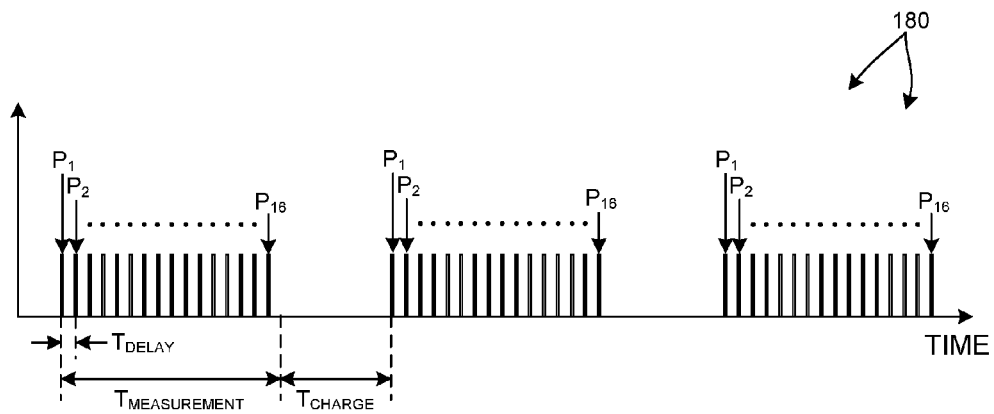
FIG. 9A depicts an exemplary diagram 180 illustrating the timing of light emission from each of sixteen pulsed illumination systems for maximum illumination field density.

FIG. 9A depicts an exemplary diagram 180 illustrating the timing of light emission from the pulse illumination systems of sixteen different LIDAR measurement channels. As depicted in FIG. 9A, a measurement pulse is emitted from a pulsed illumination source of a first LIDAR measurement channel, $P_1$. After a delay time, $T_{DELAY}$, a measurement pulse is emitted from a pulsed illumination source of a second LIDAR measurement channel, $P_2$, of the LIDAR device. In this manner a sequence of sixteen measurement pulses (e.g., $P_1$-$P_{16}$) are emitted in different directions from the LIDAR device during a measurement period, $T_{MEASUREMENT}$. The energy storage elements associated with each of the sixteen pulsed illumination systems are charged after the measurement period for a charging period, $T_{CHARGE}$. After, the charging period, another measurement pulse is emitted from each pulsed illumination system over a subsequent measurement period.

In some embodiments, the delay time is set to be greater than the time of flight of the measurement pulse sequence to and from an object located at the maximum range of the LIDAR device. In this manner, there is no cross-talk among any of the sixteen multi-pulse illumination systems.

In some other embodiments, a measurement pulse may be emitted from one pulsed illumination system before a measurement pulse emitted from another pulsed illumination system has had time to return to the LIDAR device. In some of these embodiments, care is taken to ensure that there is sufficient spatial separation between the areas of the surrounding environment interroated by each beam to avoid cross-talk.

In one aspect, the number of LIDAR measurement channels emitting pulses of illumination light from the LIDAR device is adjusted during operation of the LIDAR device. In some embodiments, the current pulses supplied to the pulsed illumination source of one or more of the LIDAR measurement channels are reduced to a negligible value to adjust the number of pulsed illumination sources emitting pulses of illumination light from the LIDAR device. In the embodiment described with reference to FIG. 7, the command signal MPC[1] determines the current supplied to pulsed illumination source 137. Similarly, command signals MPC [1:N] determine the current supplied to N different pulsed illumination sources (not shown), where N can be any positive, integer number.

Figure 9B:
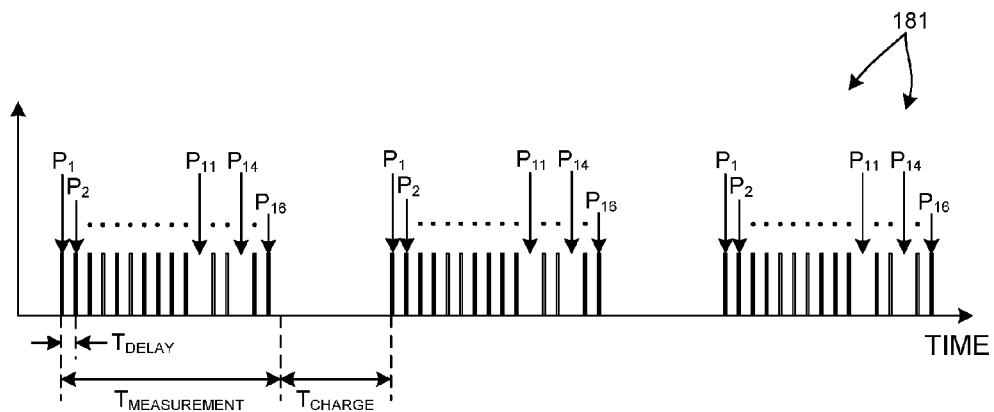
FIG. 9B depicts an exemplary diagram 181 illustrating the timing of light emission from each of sixteen pulsed illumination systems for reduced illumination field density.

FIG. 9B depicts an exemplary diagram 181 illustrating the timing of light emission from the pulse illumination systems of sixteen different LIDAR measurement channels of a LIDAR system having reduced illumination field density. As depicted in FIG. 9B, a measurement pulse is emitted from a pulsed illumination source of a first LIDAR measurement channel, $P_1$. After a delay time, $T_{DELAY}$, a measurement pulse is emitted from a pulsed illumination source of a second LIDAR measurement channel, $P_2$, of the LIDAR device, and so on. However, as depicted in FIG. 9B, no light is emitted by pulse illumination systems corresponding to measurement channels 11 and 14. This pattern continues for the three measurement cycles illustrated in FIG. 9B. This emission pattern is illustrated in FIG. 2, where no light is emitted from pulsed illumination systems corresponding to pulse index numbers 11 and 14. As depicted in FIG. 2, this changes the density of the illumination field generated by LIDAR device 10. In one embodiment, controller 140 depicted in FIG. 7 generates a control signal, MPC, that does not change the state of a switching element corresponding to the pulsed illumination source corresponding to pulse index number 11 to a conductive state. In this manner, no current flows through the illumination source, and thus, no light is emitted. Light emission from the pulsed illumination source corresponding to pulse index number 14 is controlled in a similar manner.

As depicted in FIG. 7, light reflected from location 138 is detected by light detector 155. Light detector 155 generates an output signal 151 that is amplified by an analog trans-impedance amplifier 152. In general, the amplification of output signal 151 may include multiple, amplifier stages. In this sense, analog trans-impedance amplifier 152 is provided by way of non-limiting example, as many other analog signal amplification schemes may be contemplated within the scope of this patent document.

The amplified signal 153 is communicated to controller 140. In the depicted embodiment, an analog-to-digital converter (ADC) 144 of controller 140 is employed to convert the analog signal 153 into a digital signal used for further processing. In some examples, controller 140 determines the distance associated with a particular pulse measurement and communicates an indication of the measured distance 146 to an external computing system. Controller 140 generates an enable/disable signal 145 employed to control the timing of data acquisition by ADC 144 in concert with control signal, MPC.

Figure 8:
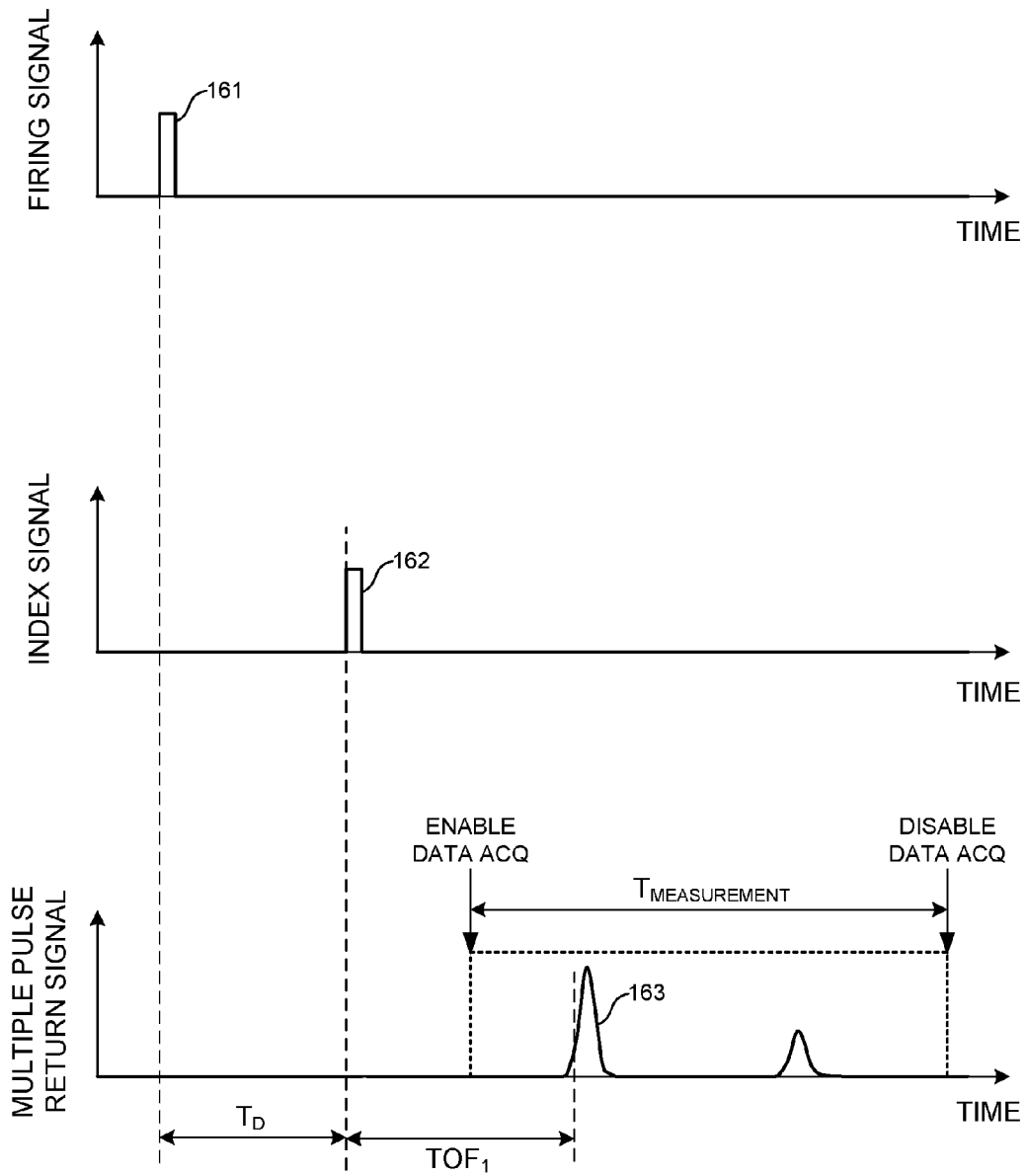
FIG. 8 depicts an illustration of the timing of emission of a pulsed measurement beam and capture of the returning measurement pulse.

FIG. 8 depicts an illustration of the timing associated with the emission of a measurement pulse and capture of the returning measurement pulse. As depicted in FIG. 8, the measurement begins with a pulse firing signal 161 (e.g., MPC[1]) generated by controller 140. Due to internal system delay, a pulse index signal 162 is determined that is shifted from the multiple pulse firing signal 161 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.).

As depicted in FIG. 8, a return signal 163 is detected by the LIDAR system in response to the illumination of a particular location. A measurement window (i.e., a period of time over which collected return signal data is associated with a particular measurement pulse sequence) is initiated by enabling data acquisition from light detecting element 150. Controller 140 controls the timing of the measurement window to correspond with the window of time when a return signal is expected in response to the emission of a measurement pulse sequence. In some examples, the measurement window is enabled at the point in time when the measurement pulse sequence is emitted and is disabled at a time corresponding to the time of flight of light over a distance that is twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 8, return signal 163 includes two return measurement pulses that correspond with the emitted measurement pulse. In general, signal detection is performed on all detected measurement pulses. Further signal analysis may be performed to identify the closest signal (i.e., first instance of the return measurement pulse), the strongest signal, and the furthest signal (i.e., last instance of the return measurement pulse in the measurement window). Any of these instances may be reported as potentially valid distance measurements by the LIDAR system. For example, a time of flight, $TOF_1$, may be calculated from the closest (i.e., earliest) return measurement pulse that corresponds with the emitted measurement pulse as depicted in FIG. 8.

In some embodiments, such as the embodiments described with reference to FIG. 1 and FIG. 2, a pulsed illumination source and photosensitive detector are mounted to a rotating frame of the LIDAR device. This rotating frame rotates with respect to a base frame of the LIDAR device. In a further aspect, the LIDAR device also includes an orientation sensor that measures the orientation of the rotating frame with respect to the base frame. In these embodiments, a computing system of the LIDAR system (e.g., controller 140 depicted in FIG. 7) periodically receives an indication of the orientation of the rotating frame with respect to the base frame. In some of these embodiments, the illumination field density is varied based on the orientation by adjusting the number of illumination sources emitting pulses of illumination light from the LIDAR device based on the orientation. In one embodiment, controller 140 communicates command signals, MPC, that adjusts the number of illumination sources emitting pulses of illumination light from the LIDAR device.

For example, in some embodiments, the LIDAR system is mounted to a vehicle operating on a roadway. The LIDAR system provides "point cloud" data to an image processing system that generates images of the environment surrounding the vehicle while it is operating on the roadway based on the "point cloud" data. In some operational scenarios, it may be desirable to obtain high resolution images of objects located in front of the vehicle and one or both sides of the vehicle. However, it may not be necessary to obtain high resolution images of objects behind the vehicle. In these examples, the LIDAR system is configured to utilize a full resolution illumination field (i.e., no skipped illumination sources) when each of the illumination beams is directed toward the front and one or both sides of the vehicle. However, when one or more of the illumination beams are directed toward the rear of the vehicle, the number of illumination sources emitting pulses of illumination light from the LIDAR device is reduced to reduce the resolution of collected data.

In some embodiments, the adjustment of the number of illumination sources emitting pulses of illumination light from the LIDAR device is based on the distance between the LIDAR device and an object detected in the three dimensional environment. In one example, the number of illumination sources is reduced for a period of time when the distance between the LIDAR device and an object detected in the three dimensional environment is less than a predetermined threshold value. In this manner, objects that are relatively close to the LIDAR device (e.g., 25 meters or less, 10 meters or less, etc.) are sampled by the LIDAR system with lower frequency. Since, the field of view of a LIDAR device extends radially, objects that are relatively close to a LIDAR device are sampled at higher resolution than objects that are relatively far from the LIDAR device, for a given illumination field density. However, for objects that are relatively close to the LIDAR device, this high sampling resolution may not be necessary to render sufficiently accurate images of close objects. In these examples, the number of illumination sources is adjusted to reduce the sampling resolution for relatively close objects.

In some embodiments, the adjustment of the number of illumination sources emitting pulses of illumination light from the LIDAR device is based on whether an object is detected in the three dimensional environment. In one example, the number of illumination sources is reduced for a period of time when an object is not detected within the field of view of one or more of the pulsed illumination beams for more than a predetermined period of time. For example, when the signals detected by the detector associated with a pulsed illumination beam are negligible in value (e.g., below a threshold value) for a predetermined period of time, controller 140 reduces or eliminates light emission from that pulsed illumination source, or a nearby illumination source. In this manner, when an illumination beam is directed toward a volume of space that is devoid of objects (e.g., toward the horizon, toward the sky, etc.), energy consumption and heat generation is reduced. However, subsequently, when signals detected by a detector associated with a nearby pulsed illumination beam rise above the threshold value, controller 140 increases, or turns on one or more pulsed illumination sources that were previously dormant, by communicating command signals, MPC, that cause each of the one or more pulsed illumination sources to emit pulses of illumination light. In some examples, an object must be detected for a second, predetermined period of time after the first, predetermined period of time before controller 140 adjusts the number of illumination sources. These thresholds prevent spurious signals from causing rapid fluctuations in the illumination field.

In some embodiments, the adjustment of the illumination field is pseudorandom. In other words, depending on conditions detected in the surrounding environment, one or more of the pulsed illumination sources may be turned off and on in a pseudorandom pattern to conserve energy and reduce heat generation.

In some embodiments, the LIDAR system includes, or is communicatively linked to an imaging device configured to generate an image of at least a portion of a field of view of the pulsed illumination source. In some embodiments, the imaging device is a computing system configured to generate an image from a number of points of the "point cloud" generated by the LIDAR device. In some of these embodiments, the computing system is separate from the LIDAR device and is communicately linked to the LIDAR device. In other embodiments, a computing system of the LIDAR system is configured to generate the image from the "point cloud" data. In some other embodiments, the imaging device includes a separate imaging sensor (e.g., camera) that captures an image of at least a portion of the field of view of the pulsed illumination source. In some of these embodiments, the imaging sensor is integrated into the LIDAR device. In some other embodiments, the imaging sensor is separate from, and communicately linked to the LIDAR device.

In these embodiments, the number of active pulsed illumination sources is adjusted based on whether an object is detected in an image of at least a portion of the field of view of one or more of the pulsed illumination sources. In some examples, the number of illumination sources is decreased when there is no object detected in an image of the field of view of the illumination sources that are turned off. In some other examples, the number of illumination sources is increased when an object is detected in the image of the field of view of previously dormant pulsed illumination sources.

In some embodiments, the number of active pulsed illumination sources is adjusted based on an indication of operating temperature of the 3-D LIDAR device. In some embodiments, the indication of operating temperature is a measured temperature of the surrounding environment. In some embodiments, the indication of operating temperature is based on one or more measured temperatures on-board the 3-D LIDAR device. For example, temperatures in close proximity to sensitive electronic components such as the illumination source (e.g., laser diode), the illumination source driver, the trans-impedance amplifier, etc., may be measured separately, or in combination, to arrive at the indication of operating temperature. In some embodiments, the spectral shift of the illumination output from the illumination source (e.g., laser diode) is measured as an indication of operating temperature. In general, any temperature measurement, or combination of temperature measurements within and surrounding the 3-D LIDAR device may be employed as an indication of operating temperature of the 3-D LIDAR device, and thus, form the basis for changing the number of active pulsed illumination sources on board the 3-D LIDAR device.

Controller 140 includes a processor 141 and a memory 142. Processor 141 and memory 142 may communicate over bus 147. Memory 142 includes an amount of memory 143 that stores program code that, when executed by processor 141, causes processor 141 to implement changes in illumination field density as described herein. By way of non-limiting example, controller 140 is operable to communicate with an external computing system (not shown) over a communications link. In one example, controller 140 communicates an indication of a measured distance 146 to an external computing system.

Figure 10:
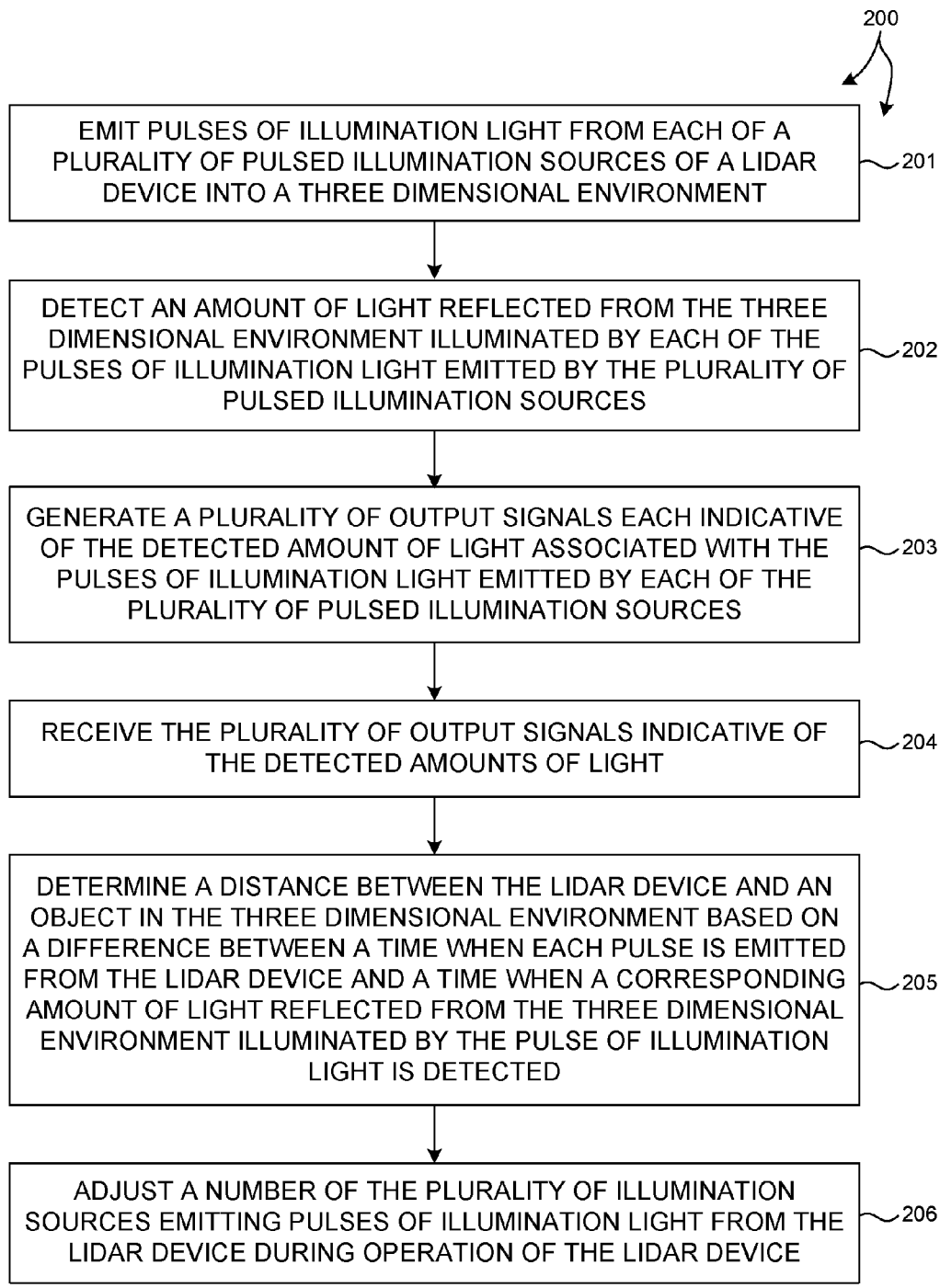
FIG. 10 depicts a flowchart illustrative of a method 200 of performing LIDAR measurements with different illumination field density in at least one novel aspect.

FIG. 10 illustrates a method 200 suitable for implementation by LIDAR systems 10 and 100 of the present invention. In one aspect, it is recognized that data processing blocks of method 200 may be carried out via a pre-programmed algorithm executed by one or more processors of computing system 140. While the following description is presented in the context of LIDAR systems 10 and 100, it is recognized herein that the particular structural aspects of LIDAR systems 10 and 100 do not represent limitations and should be interpreted as illustrative only.

In block 201, pulses of illumination light are emitted from each of a plurality of pulsed illumination sources of a LIDAR device into a three dimensional environment.

In block 202, an amount of light reflected from the three dimensional environment illuminated by each of the pulses of illumination light emitted by the plurality of pulsed illumination sources is detected.

In block 203, a plurality of output signals are generated. Each output signal is indicative of the detected amount of light associated with the pulses of illumination light emitted by a corresponding pulsed illumination source of the plurality of pulsed illumination sources.

In block 204, the plurality of output signals indicative of the detected amounts of light are received, for example, by controller 140.

In block 205, a distance between the LIDAR device and an object in the three dimensional environment is determined based on a difference between a time when each pulse is emitted from the LIDAR device and a time when a corresponding amount of light reflected from the three dimensional environment illuminated by the pulse of illumination light is detected.

In block 206, a number of the plurality of illumination sources emitting pulses of illumination light from the LIDAR device is adjusted during operation of the LIDAR device.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) device, comprising:
    a plurality of pulsed illumination sources emitting pulses of illumination light from the LIDAR device into a three dimensional environment;
    a plurality of photosensitive detectors, wherein each photosensitive detector detects an amount of light reflected from the three dimensional environment illuminated by the pulses of illumination light emitted by a corresponding pulsed illumination source of the plurality of pulsed illumination sources, and wherein each photosensitive detector generates an output signal indicative of the detected amount of light associated with the pulses of illumination light emitted by the corresponding pulsed illumination source, wherein each of the plurality of pulsed illumination sources and each of the plurality of photosensitive detectors are mounted to a rotating frame of the LIDAR device that rotates with respect to a base frame of the LIDAR device;
    an orientation sensor configured to detect an orientation of the rotating frame with respect to the base frame; and
    a computing system configured to:
        receive the plurality of output signals indicative of the detected amounts of light;
        determine a distance between the LIDAR device and an object in the three dimensional environment based on a difference between a time when each pulse of illumination light is emitted from the LIDAR device and a time when each corresponding photosensitive detector detects an amount of light reflected from the three dimensional environment illuminated by the pulse of illumination light; and
        adjust a number of the plurality of illumination sources emitting pulses of illumination light from the LIDAR device during operation of the LIDAR device, wherein the adjustment of the number of the plurality of illumination sources emitting pulses of illumination light from the LIDAR device is based on the orientation of the rotating frame with respect to the base frame.

2. The LIDAR device of claim 1, wherein the adjustment of the number of the plurality of illumination sources emitting pulses of illumination light from the LIDAR device involves reducing a current supplied to a subset of the plurality of illumination sources emitting pulses of illumination light from the LIDAR device to a reduced value.

3. The LIDAR device of claim 1, wherein the adjustment of the number of the plurality of illumination sources emitting pulses of illumination light from the LIDAR device is based on the distance between the LIDAR device and an object in the three dimensional environment.

4. The LIDAR device of claim 3, wherein the adjustment of the number of the plurality of illumination sources emitting pulses of illumination light from the LIDAR device involves reducing a number of the plurality of illumination sources emitting pulses of illumination light from the LIDAR device when the distance between the LIDAR device and an object in the three dimensional environment is less than a predetermined threshold value.

5. The LIDAR device of claim 3, wherein the adjustment of the number of the plurality of illumination sources emitting pulses of illumination light from the LIDAR device involves reducing a number of the plurality of illumination sources emitting pulses of illumination light from the LIDAR device when one or more of the output signals is less than a threshold value for a first period of time.

6. The LIDAR device of claim 5, wherein the adjustment of the number of the plurality of illumination sources emitting pulses of illumination light from the LIDAR device involves increasing the number of the plurality of illumination sources emitting pulses of illumination light from the LIDAR device when the one or more output signals exceeds the threshold value for a second period of time immediately after the first period of time.

7. The LIDAR device of claim 1, further comprising:
an imaging device configured to generate an image of at least a portion of an illumination field of the LIDAR device.

8. The LIDAR device of claim 7, wherein the adjustment of the number of the plurality of illumination sources emitting pulses of illumination light from the LIDAR device involves reducing light emission from one or more of the plurality of illumination sources when there is no object detected in a portion of the image corresponding to the field of view of the one or more illumination sources, and wherein the adjustment of the number of the plurality of illumination sources emitting pulses of illumination light from the LIDAR device involves increasing light emission from one or more of the plurality of illumination sources when there is an object detected in the portion of the image corresponding to the field of view of the one or more illumination sources.

9. The LIDAR device of claim 8, wherein the imaging device is a camera that is communicatively coupled to the LIDAR device.

10. The LIDAR device of claim 1, wherein the adjustment of the number of the plurality of illumination sources emitting pulses of illumination light from the LIDAR device involves reducing a current supplied to a subset of the plurality of illumination sources emitting pulses of illumination light from the LIDAR device such that no current flows through any of the subset of the plurality of illumination sources.

11. The LIDAR device of claim 8, wherein the imaging device is an imaging module communicatively coupled to the LIDAR device, wherein the imaging module generates the image based on a plurality of distance measurements generated by the LIDAR device.

12. A light detection and ranging (LIDAR) device, comprising:
a plurality of pulsed illumination sources emitting pulses of illumination light from the LIDAR device into a three dimensional environment;
a plurality of photosensitive detectors, wherein each photosensitive detector detects an amount of light reflected from the three dimensional environment illuminated by the pulses of illumination light emitted by a corresponding pulsed illumination source of the plurality of pulsed illumination sources, and wherein each photosensitive detector generates an output signal indicative of the detected amount of light associated with the pulses of illumination light emitted by the corresponding pulsed illumination source, wherein each of the plurality of pulsed illumination sources and each of the plurality of photosensitive detectors are mounted to a rotating frame of the LIDAR device that rotates with respect to a base frame of the LIDAR device;
an orientation sensor configured to detect an orientation of the rotating frame with respect to the base frame; and
a non-transient computer-readable medium comprising computer-readable instructions that when read by a computing system cause the computing system to:
receive the plurality of output signals indicative of the detected amounts of light;
determine a distance between the LIDAR device and an object in the three dimensional environment based on a difference between a time when each pulse of illumination light is emitted from the LIDAR device and a time when each corresponding photosensitive detector detects an amount of light reflected from the three dimensional environment illuminated by the pulse of illumination light; and
adjust a number of the plurality of illumination sources emitting pulses of illumination light from the LIDAR device during operation of the LIDAR device, wherein the adjustment of the number of the plurality of illumination sources emitting pulses of illumination light from the LIDAR device is based on the orientation of the rotating frame with respect to the base frame.

13. The LIDAR device of claim 12, wherein the adjustment of the number of the plurality of illumination sources emitting pulses of illumination light from the LIDAR device involves turning off a subset of the plurality of illumination sources emitting pulses of illumination light from the LIDAR device.

14. The LIDAR device of claim 12, wherein the adjustment of the number of the plurality of illumination sources emitting pulses of illumination light from the LIDAR device is based on the distance between the LIDAR device and the object in the three dimensional environment.

15. The LIDAR device of claim 12, wherein the adjustment of the number of the plurality of illumination sources emitting pulses of illumination light from the LIDAR device is based on an indication of an operating temperature of the LIDAR device.

16. A method comprising:
emitting pulses of illumination light from each of a plurality of pulsed illumination sources of a LIDAR device into a three dimensional environment;

detecting an amount of light reflected from the three dimensional environment illuminated by each of the pulses of illumination light emitted by the plurality of pulsed illumination sources;

generating a plurality of output signals each indicative of the detected amount of light associated with the pulses of illumination light emitted by each of the plurality of pulsed illumination sources; and receiving the plurality of output signals indicative of the detected amounts of light;

determining a distance between the LIDAR device and an object in the three dimensional environment based on a difference between a time when each pulse is emitted from the LIDAR device and a time when a corresponding amount of light reflected from the three dimensional environment illuminated by the pulse of illumination light is detected; and adjusting a number of the plurality of illumination sources emitting pulses of illumination light from the LIDAR device during operation of the LIDAR device, wherein the adjusting of the number of the plurality of illumination sources emitting pulses of illumination light from the LIDAR device is based on an orientation of a rotating frame of a LIDAR device that rotates with respect to a base frame of the LIDAR device.

17. The method of claim 16, further comprising:

imaging at least a portion of a field of view of the plurality of pulsed illumination sources, wherein the adjusting of the number of the plurality of illumination sources emitting pulses of illumination light from the LIDAR device involves reducing the number when there is no object detected in the image and increasing the number when there is an object detected in the image.

* * * * *